F. E. L. SUNDBAUM.
PRESSURE GAGE LOG.
APPLICATION FILED JUNE 21, 1917.

1,323,119. Patented Nov. 25, 1919.

3 SHEETS—SHEET 1.

Witness.
E. J. Sheehy.

Inventor
F. E. L. Sundbaum.
by James J. Sheehy & Co., attys.

F. E. L. SUNDBAUM.
PRESSURE GAGE LOG.
APPLICATION FILED JUNE 21, 1917.

1,323,119. Patented Nov. 25, 1919.

3 SHEETS—SHEET 2.

Witness
E. J. Sheehy.

Inventor,
F. E. L. Sundbaum
by James Sheehy & Co., attys.

F. E. L. SUNDBAUM.
PRESSURE GAGE LOG.
APPLICATION FILED JUNE 21, 1917.

1,323,119.

Patented Nov. 25, 1919.

3 SHEETS—SHEET 3.

Witness.
E. J. Sheehy.

Inventor
F. E. L. Sundbaum
by James J. Sheehy & Co., Attys.

UNITED STATES PATENT OFFICE.

FRANS ERIK LUDVIG SUNDBAUM, OF STOCKHOLM, SWEDEN.

PRESSURE-GAGE LOG.

1,323,119. Specification of Letters Patent. Patented Nov. 25, 1919.

Application filed June 21, 1917. Serial No. 176,140.

*To all whom it may concern:*

Be it known that I, Frans Erik Ludvig Sundbaum, a citizen of the Kingdom of Sweden, residing at Stockholm, Sweden, have invented new and useful Improvements in Pressure-Gage Logs, of which the following is a specification.

This invention relates to pressure gage logs and more especially to logs of that kind provided with a device for operating at a distance one or more indicators indicating, under the control of the speed indicator of the log, the distance traveled by the vessel.

The invention resides, chiefly, in this that the log is provided with a switch for a circuit adapted to actuate said distance indicator, the switch closing and breaking said circuit so many times for each unit of time, as is determined by the speed indicator, and the distance indicator being moved a certain distance for each closing or breaking of the circuit.

A specific embodiment of the invention is illustrated in the accompanying drawings, in which:—

Figure 1:
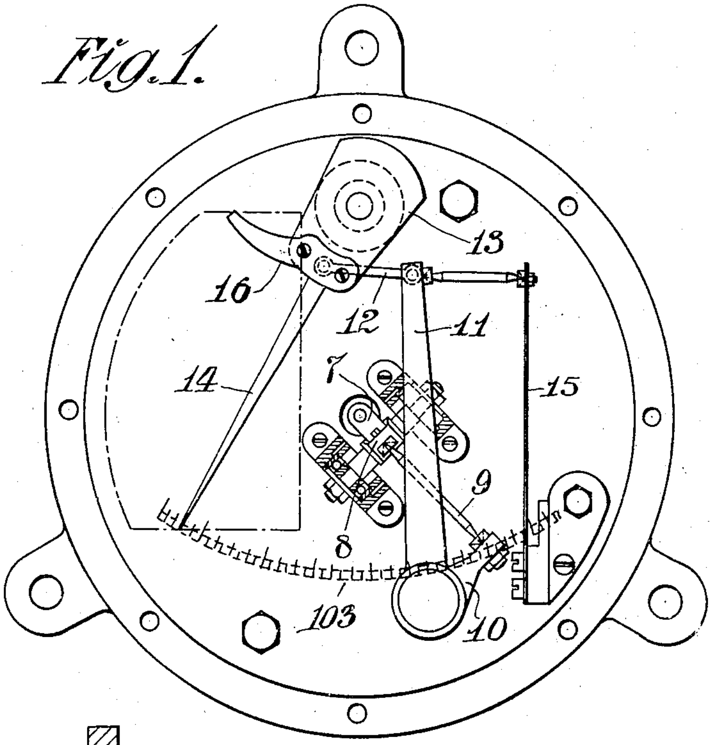
Figure 2:
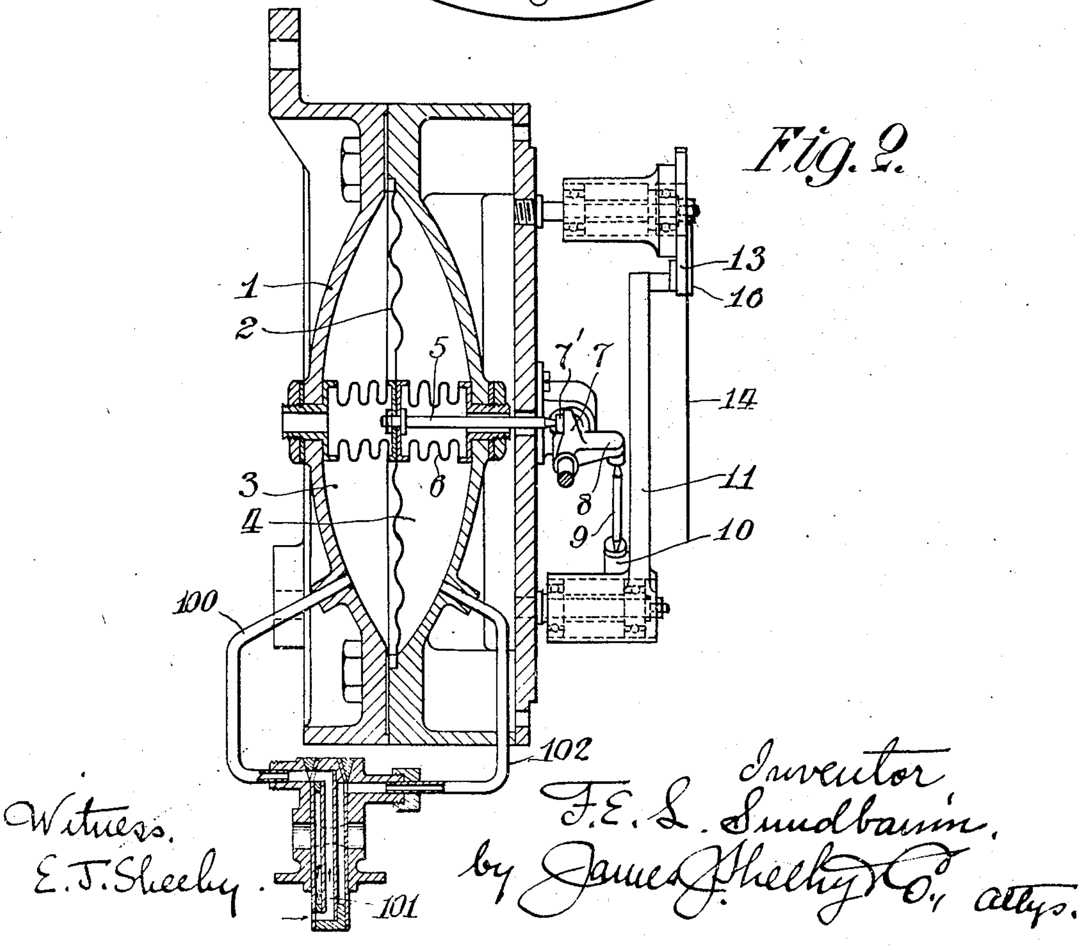
Figure 3:
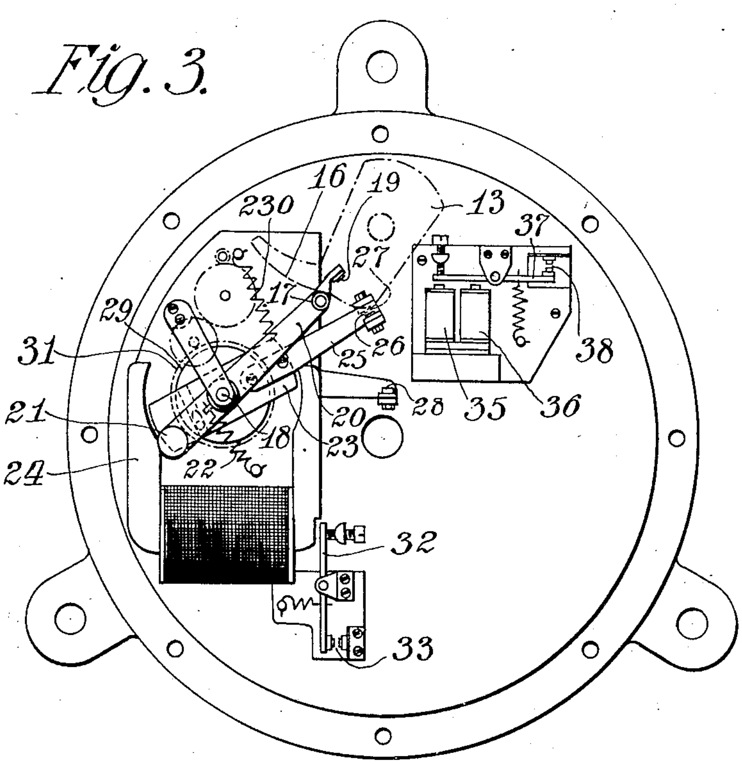
Figures 3A, 4:
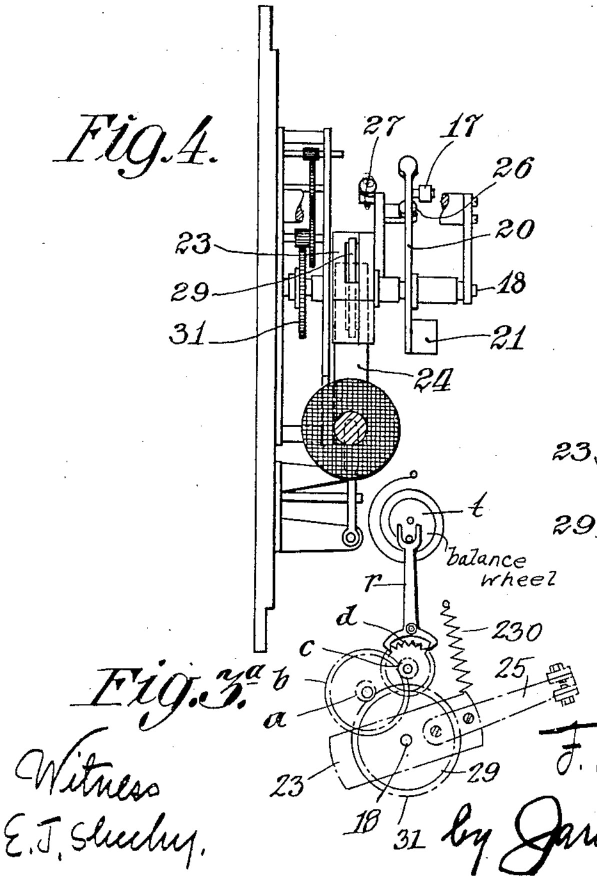
Figure 5:
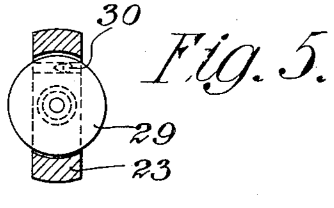
Figure 6:
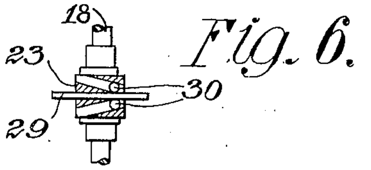
Figure 7:
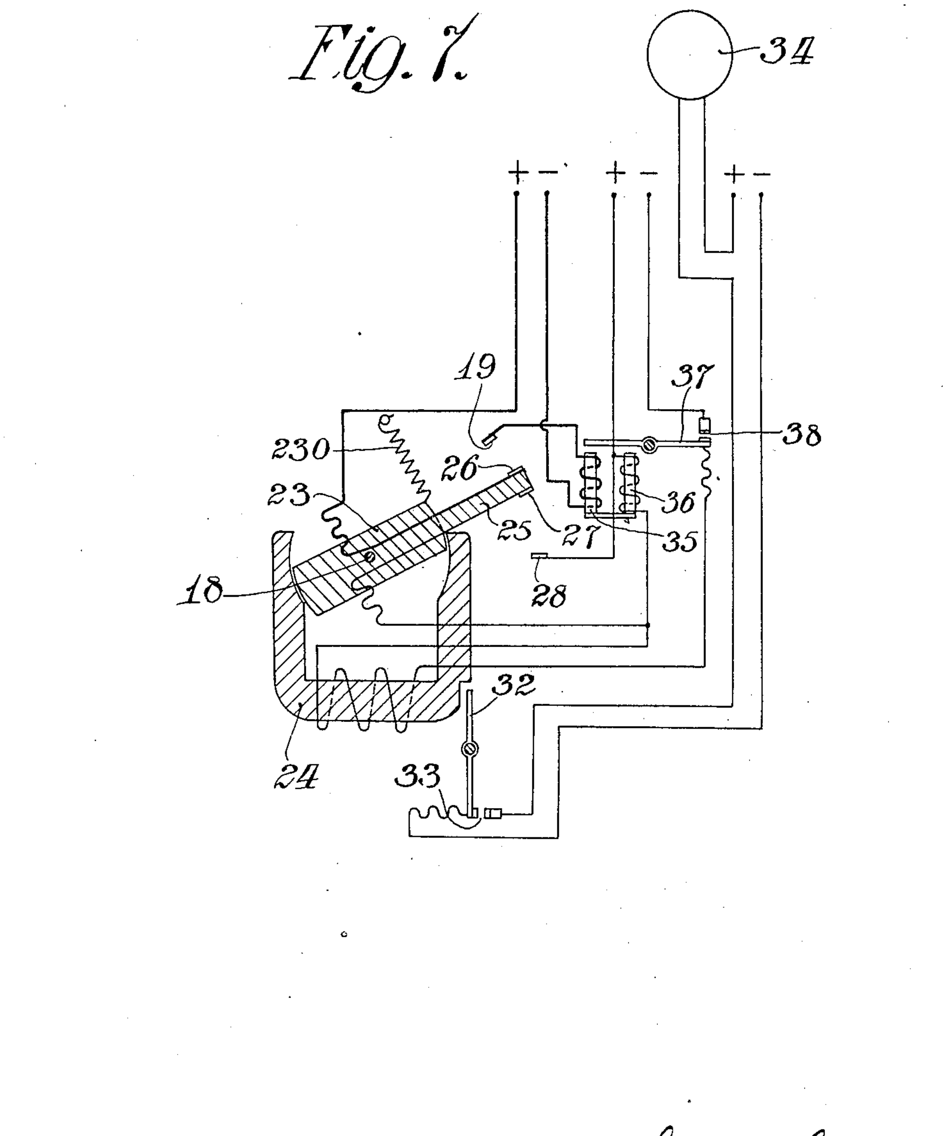

Figure 1 is a front view of the log showing only the principal parts of the speed indicator. Fig. 2 is a sectional view of the log showing likewise only said principal parts. Fig. 3 is another front view of the log showing only the parts thereof devised according to the invention. Fig. 3ª is a chiefly diagrammatical elevation of the brake mechanism. Fig. 4 is a side view showing the latter parts. Figs. 5 and 6 are two sectional views taken at right angles to each other through an armature of an electromagnet, and Fig. 7 is a diagram of electric connections of the apparatus.

Referring to Figs. 1 and 2, the log comprises a diaphragm casing 1 containing a diaphragm 2 which divides the interior of casing 1 into two compartments 3 and 4. The compartment 3 is designed to be connected through a piping 100 with a Pitot-pipe 101 to transmit to the said compartment the pressure arising from the speed of the vessel and the hydrostatic pressure, while the compartment 4 is designed to be connected with piping 102 to transmit to this compartment the hydrostatic pressure alone. Secured to the diaphragm 2 is a rod 5 extending through the wall of the casing 1, the tightening being effected by means of a folded, flexible tube 6 surrounding the rod 5 and secured to the diaphragm 2 and to the wall of the casing. The free pointed end of the rod 5 engages a correspondingly formed block 7′ secured to one arm 7 of an easily movable bell crank lever, the other arm 8 of which is connected, by means of a rod 9 having pointed ends, with one arm 10 of another bell crank lever, the other arm 11 of which is connected through a link 12 with the support 13 of a pointer 14 indicating the temporary speed of the vessel. A spring 15 actuates the arm 11 in a direction opposite to that in which the bell crank lever 10, 11 is moved under the influence of the rod 9, by the pressure caused by the speed of the vessel.

The support 13 of the pointer 14 carries also a curved arm 16 intended for the purpose described below. Bearing against said curved arm 16 is a roller 17 (Figs. 3 and 4) attached to an arm 20 which is movably journaled on a shaft 18 and provided with a contact 19. The arm 20 carries, preferably a counter-weight 21 and is actuated by a spring 22 tending to keep the roller 17 in contact with the curved arm 16. Movably journaled on the shaft 18 is also the armature 23 of an electromagnet 24, said armature being actuated by a spring 230. Secured to the armature 23 is an arm 25 carrying two contacts 26 and 27, one 26 of which is designed to coöperate with the contact 19 of the arm 20, while the contact 27 is designed to coöperate with a stationary contact 28, when the armature 23 is in its attracted position. Inserted in an aperture made in the armature 23 is a disk 29 secured to the shaft 18 and adapted by means of a ball clutch 30, to be turned by the armature 23, when moving in one direction, whereas the disk is at rest, when the armature moves in the opposite direction. The disk 29 is, by means of a toothed wheel 31, which is secured to the shaft 18, connected with suitable brake, for instance a clock-work controlling the movement of the disk 29. This brake mechanism includes in order, the wheel 31, attached to the shaft 18 the pinion *a*, meshing therewith, the wheel *b*, rigidly connected with *a* and meshing with the pinion *c*, which is, in turn, rigidly connected with the toothed wheel *d* co-acting with a regulator *r* of well-known character, said regulator in turn co-acting with the balance wheel *t*.

The electromagnet 24 is provided with an-

BEST AVAILABLE COPY other armature 32 (Fig. 3) designed to control a contact 33 which is put in the circuit of an electrically operated indicator located at a distance and adapted to indicate the distance traveled by the vessel, said indicator being denoted by 34 in Fig. 7.

The apparatus comprises further a relay consisting of two coils 35 and 36, the armature 37 of which controls a contact 38.

The devices shown in Figs. 3 and 4 are electrically interconnected, as is shown in Fig. 7, wherein the same reference numerals as in Figs. 3 and 4 are used.

The contact 19 is through the winding of the coil 35 connected with the one pole of a source of current (not shown), the other pole of which is connected with the contact 26. The winding of the coil 36 is connected in series with the winding of the electromagnet 24 and with another circuit comprising the contact 33. A circuit short-circuiting the coil 36 may be closed by the contacts 27 and 28.

The apparatus described above operates as follows: The pressure caused by the speed of the vessel and actuating the diaphragm 2 is transmitted through the members 5, 7, 8, 9, 10, 11, 12, 13 to the pointer 14, which makes a deflection corresponding to said pressure on the knot-dial, on which the temporary speed of the vessel may, consequently, be observed. The curved arm 16 constructed empirically and secured firmly to the pointer 14 adjusts the arm 20 to different positions, according as the deflection of the pointer 14 is changed, for instance in such manner that the angular distance between the contacts 19 and 28 in relation to the shaft 18 is changed proportionally to the changes of the speed of the vessel.

When the electromagnet 24 is not excited, the armature 23 together with the arm 25 is turned upward by the spring 230. The armature, when moving in this manner, carries with it, by means of the ball clutch 30, the disk 29, which in turn actuates the clockwork, by means of which the upward motion of the armature 23 is regulated so as to be performed with constant speed. When the contact 26 touches the contact 19, the circuit through the coil 35 is closed and the armature 37 is attracted thus closing the contact 38. Owing thereto, the circuit through the coil 36 and the winding of the electromagnet 24 is closed and, consequently, the electromagnet 24 is excited and attracts both armatures 23 and 32. During this movement the armature 23 does not carry with it the disk 29, and the return movement of the armature will therefore, practically taken, be instantaneous. As soon as the contact 26 leaves the contact 19, the circuit through the coil will be broken, whereas the armature 37 will remain attracted by the coil 36, until the contact 27 touches the stationary contact 28. At this moment the coil 36 is shortcircuited, and on account thereof the armature 37 is turned back thus breaking the contact 38, so that the circuit of the electromagnet 24 is broken at the same time and the armatures 23 and 32 are released. While the armature 23 was moved back from the uppermost to the lowermost position, the circuit of the distance indicator 34 was kept closed at the contact 33, and, owing thereto, the counting mechanism of the distance indicator was turned a certain distance.

When the contact 27, 28 is closed and the armature 23 is released from the electromagnet 24, the spring 230, which was extended at the attraction of the said armature, will commence to turn the armature upward with a constant speed controlled by the clockwork. The time required for moving the contact 26 back to the contact 19 depends upon the temporary position of the arm 20, which in turn depends upon the speed of the vessel, and consequently the time passing between the closings of the contact 33 will depend upon the speed of the vessel. The greater the speed is, the greater deflection is effected by the pointer 14, and the smaller the angular distance between the contacts 19 and 28 will be, and consequently the more frequently the circuit of the distance indicator will be closed per unit of time. The distance indicator may be constructed in any well-known manner. The adjustment of the apparatus for elimination of sources of error may be effected by adjusting the shape of the curved arm 16.

The device for transmission of the movements of the diaphragm to the pointer is only shown by way of example and may be varied in any manner without deviating from the principle of the invention, and the devices controlling the circuit of the distance indicator may also be modified in different manners.

The apparatus may be used for controlling from one log any number of distance indicators located at a distance and, preferably, connected in parallel with the same circuit.

Having now particularly described and ascertained the nature of my said invention and in what manner the same is to be performed, I declare that what I claim is:

1. In a pressure gage log, the combination with means for indicating the speed of a vessel of means for indicating at a distance the distance traveled by the vessel, an electric circuit operating said distance indicating means, a switch constructed and arranged to close and break said circuit, and means controlled by said speed indicating means and constructed and arranged to regulate the frequency of the said closings and breakings per unit of time.

2. In a pressure gage log, the combination with means for indicating the speed of a vessel of means for indicating at a distance the distance traveled by the vessel, a movable contact adjustable to various positions by said speed indicating means, a stationary contact, an electric circuit comprising said contacts and operating said distance indicating means, contact means movable with constant speed under the control of said speed indicating means between said contacts and adapted to break and close said circuit in conformity with the movements of said speed indicating means, and means whereby the contact means are caused to move at constant speed.

3. In a pressure gage log, the combination with means for indicating the speed of a vessel of means for indicating at a distance the distance traveled by the vessel, an indicating member actuated by said speed indicating means, a movable contact adjustable to various positions by said indicating member, a stationary contact, an electric circuit comprising said contacts and operating said distance indicating means, contact means movable with constant speed under the control of said speed indicating means between said contacts and adapted to break and close said circuit in conformity with the movements of said speed indicating means, and means whereby the contact means are caused to move at constant speed.

4. In a pressure gage log, the combination with means for indicating the speed of a vessel of means for indicating at a distance the distance traveled by the vessel, a movable contact adjustable to various positions by said speed indicating means, a stationary contact, an electric circuit comprising said contacts and operating said distance indicating means, contact means movable with constant speed under the control of said speed indicating means between said contacts and adapted to break and close said circuit in conformity with the movements of said speed indicating means, an electromagnet the circuit of which is controlled by said movable contact means, an armature of said electromagnet supporting said movable contact means, and means whereby the contact means are caused to move at constant speed.

5. In a pressure gage log, the combination with means for indicating the speed of a vessel of means for indicating at a distance the distance traveled by the vessel, an indicating member actuated by said speed indicating means, a movable contact adjustable to various positions by said indicating member, a stationary contact, an electric circuit comprising said contacts and operating said distance indicating means, contact means movable with constant speed under the control of said speed indicating means between said contacts and adapted to break and close said circuit in conformity with the movements of said speed indicating means, an electromagnet the circuit of which is controlled by said movable contact means, an armature of said electromagnet supporting said movable contact means, and means whereby the contact means are caused to move at constant speed.

6. In a pressure gage log, the combination with means for indicating the speed of a vessel of means for indicating at a distance the distance traveled by the vessel, an indicating member actuated by said speed indicating means, a movable contact adjustable to various positions by said indicating member, a stationary contact, an electric circuit comprising said contacts and operating said distance indicating means, contact means movable between said contacts and adapted to break and close said circuit in conformity with the movements of said speed indicating means, an electromagnet the circuit of which is controlled by said movable contact means, an armature of said electromagnet supporting said movable contact means, and brake mechanism operated by said movable contact means and rendering its speed constant in one direction of movement.

In testimony whereof I have signed my name.

FRANS ERIK LUDVIG SUNDBAUM.